United States Patent
Bunting et al.

(10) Patent No.: US 10,189,198 B2
(45) Date of Patent: Jan. 29, 2019

(54) MULTI-LAYER HOSE AND HOSE FORMULATION

(71) Applicant: Swan Products LLC, Totowa, NJ (US)

(72) Inventors: Norm Bunting, Sparks, NV (US); Steve Lorraine, Glastonbury, CT (US)

(73) Assignee: Swan Products, LLC, Sandy Springs, GA (US)

( * ) Notice: Subject to any disclaimer, the term of this patent is extended or adjusted under 35 U.S.C. 154(b) by 545 days.

(21) Appl. No.: 14/519,742

(22) Filed: Oct. 21, 2014

(65) Prior Publication Data

US 2016/0033060 A1 Feb. 4, 2016

Related U.S. Application Data

(60) Provisional application No. 62/032,219, filed on Aug. 1, 2014.

(51) Int. Cl.
*B32B 1/08* (2006.01)
*B29C 47/06* (2006.01)
(Continued)

(52) U.S. Cl.
CPC ........ *B29C 47/067* (2013.01); *B29C 47/0064* (2013.01); *B29C 47/0023* (2013.01); *B29C 47/0052* (2013.01); *B29K 2027/06* (2013.01); *B29K 2105/10* (2013.01); *B29K 2267/00* (2013.01); *B29K 2995/0077* (2013.01); *B29L 2023/005* (2013.01); *F16L 11/081* (2013.01); *F16L 11/085* (2013.01)

(58) Field of Classification Search
CPC ................. B32B 1/08; B29C 47/0064; B29K 2995/0077; F16L 11/085
See application file for complete search history.

(56) References Cited

U.S. PATENT DOCUMENTS

| | | |
|---|---|---|
| 3,900,545 A | 8/1975 | Korejwa et al. |
| 4,249,971 A | 2/1981 | Yap et al. |

(Continued)

OTHER PUBLICATIONS

Merriam-Webster's Collegiate Dictionary, Tenth Edition, pp. 4a and 1174, Merriam-Websters Incorporated, 1998.*

(Continued)

*Primary Examiner* — Marc A Patterson
(74) *Attorney, Agent, or Firm* — Polsinelli, PC

(57) ABSTRACT

Multilayer hose construction and hose formulation provide a surprising combination of physical properties and enhanced performance, more specifically providing improved kink resistance and burst strength. The garden hose comprises an extruded composite tube including core and jacket layers of a polyvinyl chloride (PVC) compound and an intermediate reinforcement layer having interstices through which the core and jacket layers are bonded, the PVC compound comprising: 100 PPH (parts in weight per hundred parts of resin) of PVC resin; and 45-75 PPH of plasticizer. The PVC compound has a K value in a range of 79-85 measured according to standard ISO1628-2 and a specific gravity in a range of 1.17-1.23 measured according to standard ASTM D792. The composite tube has a bend radius of less than 3 inch and the composite tube has a minimum burst pressure of 500 psi measured according to standard ISO 1402:2009.

16 Claims, 3 Drawing Sheets

(51) Int. Cl.
*B29C 47/00* (2006.01)
*B29K 27/06* (2006.01)
*B29K 105/10* (2006.01)
*B29K 267/00* (2006.01)
*B29L 23/00* (2006.01)
*F16L 11/08* (2006.01)

(56) References Cited

U.S. PATENT DOCUMENTS

| | | | |
|---|---|---|---|
| 4,275,768 A | | 6/1981 | Riggs et al. |
| 4,306,591 A | * | 12/1981 | Arterburn ............. F16L 11/086 138/124 |
| 4,361,455 A | * | 11/1982 | Arterburn ............. F16L 11/086 156/149 |
| 4,385,018 A | * | 5/1983 | Kutnyak ............... B29C 47/023 264/103 |
| 4,658,896 A | * | 4/1987 | Milam ................ E21B 17/1078 166/241.6 |
| 6,109,306 A | * | 8/2000 | Kleinert ................ F16L 11/083 138/125 |
| 2004/0134555 A1 | * | 7/2004 | Powell ..................... B32B 1/08 138/141 |
| 2007/0149713 A1 | * | 6/2007 | Kuwahata ............. C08F 263/00 525/244 |
| 2008/0188789 A1 | | 8/2008 | Galavotti et al. |
| 2008/0202621 A1 | * | 8/2008 | Kanao ..................... F16L 11/10 138/129 |
| 2011/0174410 A1 | * | 7/2011 | Li ......................... F16L 11/085 138/141 |
| 2011/0303317 A1 | | 12/2011 | Montalvo et al. |

OTHER PUBLICATIONS

International Standard ISO 1402:2009(E), Rubber and plastics hoses and hose assemblies—Hydrostatic testing, ISO 2009, Switzerland.

* cited by examiner

MULTI-LAYER HOSE AND HOSE FORMULATION

FIELD OF THE INVENTION

The present invention relates to flexible garden hoses, and more specifically is directed to a new hose formulation and multi-layer hose construction that resists permanent deformation under compressive forces and resists kinking.

BACKGROUND OF THE INVENTION

Flexible garden hose has been manufactured for many years, first out of natural rubber and more recently out of synthetic rubber, thermoplastic elastomers and plasticized thermoplastic materials. Many hoses have a layered construction that includes an inner tube layer, a reinforcement layer (e.g., spiraled, braided or fabric) wrapped around the inner tube layer, and an outer jacket layer. Additional layers may be provided over or between these layers.

Kinking occurs when a hose is doubled over or twisted, often during routine movements by the user. Kinking causes a cessation of fluid flow, and requires the user to spend time straightening the hose, which may include turning off the fluid source (spigot). Some hoses are provided with a device adjacent the spigot that resists kinking at the end of the hose. However, the rest of the hose may still kink, frustrating the user.

There is an ongoing need for a hose construction that resists kinking and a hose that will maintain its cylindrical cross section, allowing unimpeded fluid flow, during use.

SUMMARY OF THE INVENTION

In accordance with the present invention, a new hose compound and multilayer hose construction provide a surprising combination of physical properties and enhanced performance, more specifically providing improved kink resistance and burst strength. Typically in the prior art, improvements in kink resistance and burst strength required a thicker (heavier) construction, thus rendering the hose more expensive, difficult to coil and heavy to use and move around. In contrast, the present invention enables the construction of a lighter weight hose, that is both easy to handle and economical to manufacture, with improved properties of burst strength and kink resistance. Of particular note, the hose of the present invention has a bend radius (before kinking) that falls well below that of most commercially acceptable garden hoses. Whereas the prior art hoses will typically kink at a bend radius of 3¾ to 4 inches, in contrast the hose of the present invention can be bent below 3 inches, and even as low as 1 inch and below. This improved kink resistance was measured with no fluid pressure, which is a more stringent test than while pressurized with fluid at normal operating pressures (e.g., 60 psi). The hose will maintain its original circular cylindrical shape, thus maintaining the desired water pressure under normal operating conditions.

For example, when a coiled conventional hose is attached to a water spigot and pressurized to approximately 60 psi (standard commercial water pressure), and the hose is pulled from the coil, numerous loops may form over the length of the hose eventually resulting in several kinks that restrict the flow of water. However, a hose of the present invention, when similarly pressurized and handled, will resist such kink formation. Even after intentionally putting small loops in the hose and pulling, the natural inclination of the hose is to twist out the kinks rather than kink. As a further benefit, the hose of the present invention is disposed to lay straight when uncoiled, compared to many commercially available hoses.

In one embodiment of the present invention, a garden hose is provided comprising an extruded composite tube including core and jacket layers of a polyvinyl chloride (PVC) compound and an intermediate reinforcement layer disposed between the core and jacket layers, the reinforcement layer comprising a spiraled, braided or fabric layer wound around the core layer and having interstices through which the core and jacket layers are bonded, and the PVC compound comprising:

100 PPH (parts in weight per hundred parts of resin) of PVC resin; and 45-75 PPH of plasticizer;

the PVC compound having a K value in a range of 79-85 measured according to standard ISO1628-2 and a specific gravity in a range of 1.17-1.23 measured according to standard ASTM D792; the composite tube having a circular cylindrical cross-section and a wall thickness in a range of 115 to 145 mils (thousandths of an inch); wherein a 12 inch length of the composite tube at zero fluid pressure maintains its circular cylindrical cross-section without kinking at a bend radius of less than 3 inch and the composite tube has a minimum burst pressure of 500 psi measured according to standard ISO 1402:2009.

In another embodiment of the invention, the PVC compound includes 60-100 PPH of a first PVC resin having a K value in a range of 81-85, and 0-40 PPH of the second PVC resin having a K value in a range of 73-77.

In another embodiment of the invention, the first PVC resin comprises 70-95 PPH and the second PVC resin comprises 5-30 PPH.

In another embodiment of the invention, the second PVC resin comprises 20-40 PPH and the plasticizer comprises 55-75 PPH.

In another embodiment of the invention, the first PVC resin comprises 80 PPH and the second PVC resin comprises 20 PPH, and the PVC compound has a K value in a range of 79-82.

In another embodiment of the invention, the PVC compound includes one or more additives comprising: a heat stabilizer; an anti-oxidant; a lubricant; and a colorant.

In another embodiment of the invention, the PVC compound has a specific gravity in a range of 1.17-1.21.

In another embodiment of the invention, the PVC compound has a K value in a range of 79-82.

In another embodiment of the invention, the PVC compound comprises: from 0.5-1.0 PPH of one or more lubricants; from 0.1-5.0 PPH of one or more stabilizers; and from 0.2-10.0 PPH of one or more co-stabilizers.

In another embodiment of the invention, the plasticizer is selected from the group consisting of phthalate plasticizers and succinate esters.

In another embodiment of the invention, the composite tube further comprises a tie material for bonding the core and jacket layers together.

In another embodiment of the invention, the reinforcement layer comprises polymer strands or a textile fabric.

In another embodiment of the invention, the reinforcement member comprises a polyester strands wound in a criss-cross pattern around the core layer.

In another embodiment of the invention, the composite tube has a bend radius of less than 1 inch.

In another embodiment of the invention, the hose is configured for supplying a water pressure of 40-150 psi.

In another embodiment of the invention, the core layer has a circular cross section and wall thickness in a range of 50.5-85.5 mils, and the jacket layer has a circular cross section and wall thickness in a range of 50.5 to 65.5 mils.

In another embodiment of the invention, a method of manufacturing a composite tube by extrusion is provided, comprising steps of: preparing a PVC compound containing 100 PPH of PVC resin and 40-75 PPH of plasticizer, the PVC compound having a K value in the range of 79-85 measured according to standard ISO1628-2 and a specific gravity in a range of 1.17-1.23 measured according to standard ASTM D792; extruding a first tube of the PVC compound; the extruded first tube having a circular cross-section and a wall thickness in a range of 50.5-85.5 mils; wrapping a reinforcement layer around the first tube; extruding a second tube from the PVC compound over the reinforcement layer and first tube, the extruded second tube having a circular cross section and a wall thickness in a range of 50.5 to 65.5 mils; wherein a 12 inch length of the composite tube maintains a circular cross-section without kinking at a bend radius of less than 3 inch and provides a minimum burst pressure of 500 psi measured according to standard ISO 1402:2009.

In another embodiment of the method, the first PVC resin comprises 80 PPH and the second PVC resin comprises 20 PPH, and the PVC compound has a K value in a range of 79-82.

In another embodiment of the method, the composite tube has a bend radius of less than 1 inch.

In another embodiment of the method, the composite tube further comprises a tie material for bonding the core and jacket layers together.

These and other features and advantages of the present invention will be apparent to the skilled person upon review of the attached drawings and the following detailed description of various embodiments of the invention.

DETAILED DESCRIPTION

The present invention is directed to a flexible garden hose that will maintain its circular cylindrical cross section while being maneuvered by a user during routine use, and thus maintain unimpeded fluid flow. The hose has a multi-layer construction, and includes select materials that together provide enhanced resistance to permanent compressive deformation, and thus resistance to kinking.

Figure 1:
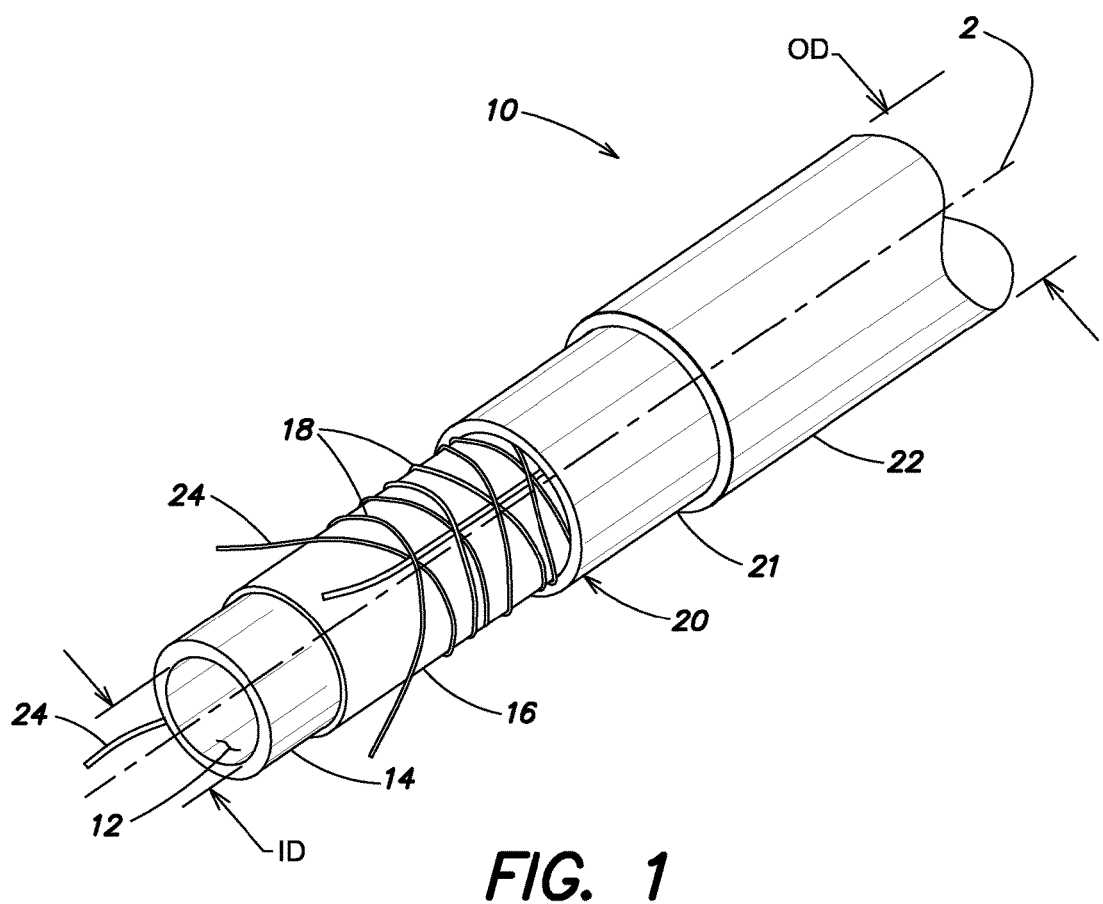
FIG. 1 is a perspective view, of a portion of a garden hose in accordance with one embodiment of the invention, in which the layers are partially removed for purposes of better illustration of the hose construction.
Figure 2:
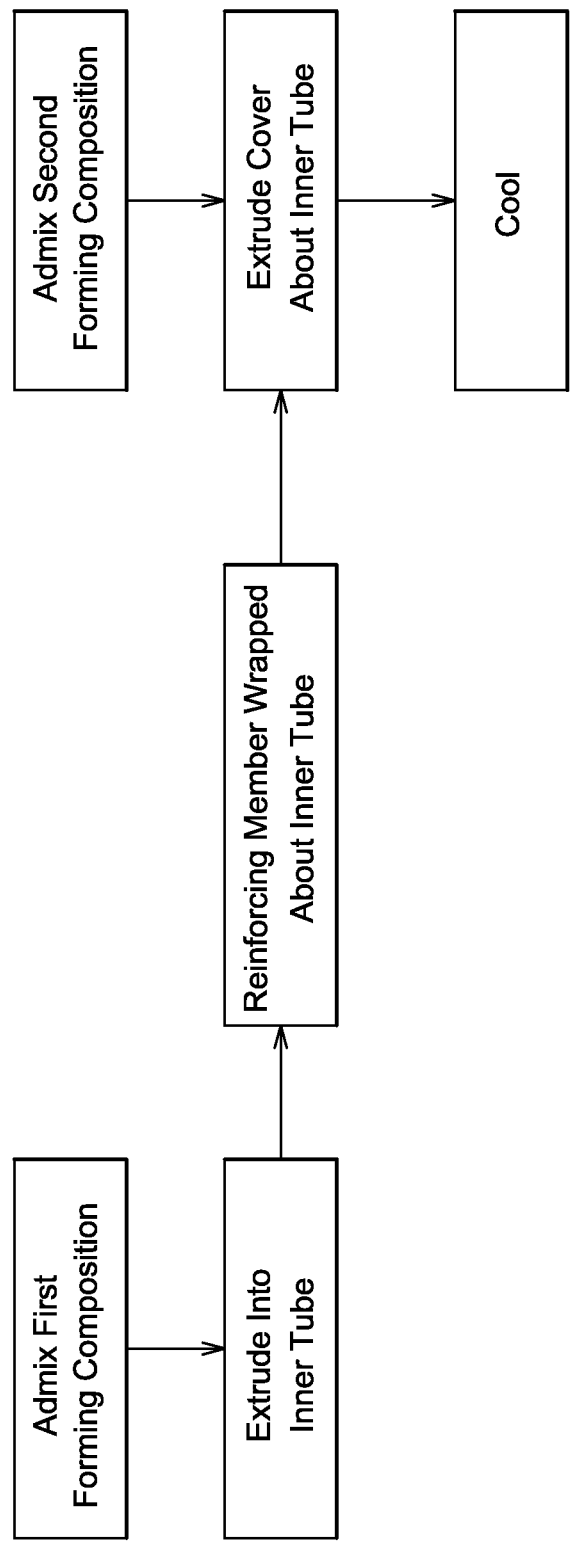
FIG. 2 is a flow chart of a method of manufacturing a hose according to one embodiment of the invention.
Figure 3A:
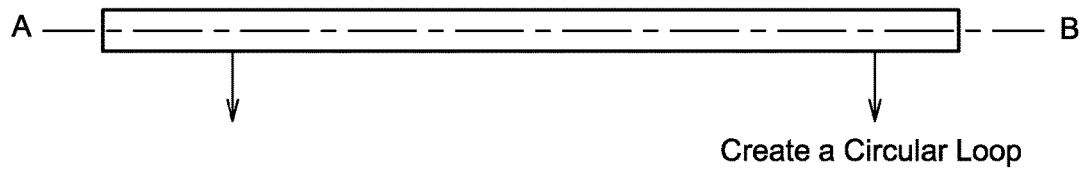
FIG. 3 is a flow chart of a method of determining a bend radius of the hose, including a series of four schematic illustrations (labeled 3A-3D) for bending a sample length of hose to determine the bend radius.
Figure 3B:
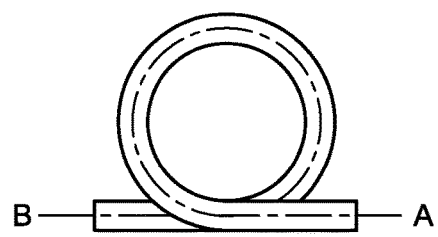
Figure 3C:
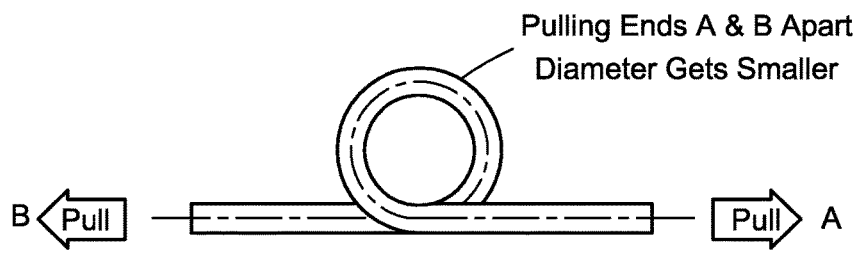
Figure 3D:
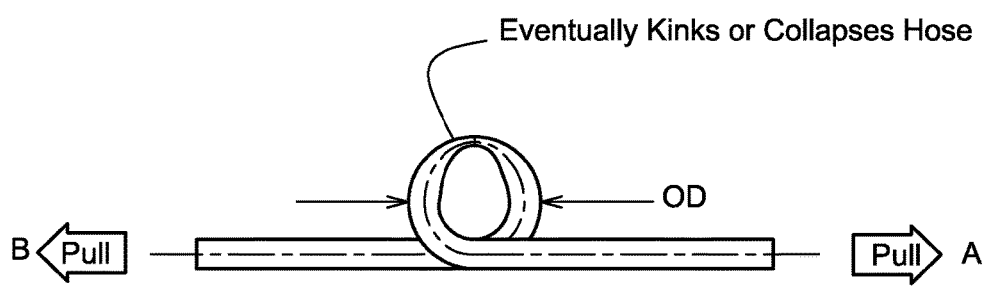

FIG. 1 shows an embodiment of this invention in which a flexible hose 10 has a longitudinal axis 2 that is diametrically centered within a central lumen 12. The hose 10 extends axially along the central longitudinal axis 2 and has a length that may vary depending on the intended use. A fitting or coupler (made of metal or plastic) is typically crimped or otherwise attached to one end of the hose, the coupler having a threaded internal surface for attachment to a faucet (spigot) and an outer hexagonal (or the like) surface for grasping and rotation by the user. Alternative coupling members may be provided on one or both ends of the hose and are not shown as they are not of particular relevance to the invention.

As used herein, a garden hose is meant to include any of various hoses that are of the size and type commonly used for watering plants, or for cleaning (e.g., houses, boats, animals and the like). The fluid conveyed by such a hose is normally water, but may comprise other fluids such as herbicides, insecticides, fertilizer or cleaning solutions. The hoses may vary in length, e.g., in a range of 10 feet (3 meters) to 300 feet (91 meters), with an inside diameter of from about 0.125 inch (0.3 cm) to about 2 inches (5 cm). Typically, a garden hose is provided in lengths of 25, 50 or 100 feet, with an inside diameter of ⅝ (0.625) inch or ¾ (0.75) inch.

Returning to FIG. 1, the flexible hose 10 has a substantially circular cylindrical cross section defined by an innermost circular diameter ID, that forms the central lumen 12, and an outermost circular diameter OD that forms the outer surface of the outermost layer. The hose has multiple concentric layers provided, in serial order going from the inner diameter to the outer diameter: 1) an inner tube layer 14 forming the central lumen 12; 2) an optional tie layer 16 for improved adherence of the adjacent layers; 3) a wrapped reinforcement layer 18; and 4) an outer jacket layer 20. Optionally, the outer jacket layer includes a first (inner) jacket layer 21 and a second outermost jacket layer 22.

The inner tube layer 14 and at least the first outer jacket layer 21 are made from a PVC compound including an ultra high molecular weight (UHMW) polyvinyl chloride (PVC) resin and a plasticizer, wherein the compound has a K value in a range of from about 79 to about 85 measured according to standard ISO 1628-2.

Further, the PVC compound has a specific gravity in a range of from 1.17 to 1.23, measured according to standard ASTM D792. The combination of K value and specific gravity, combined with the wall thickness of core and jacket layers made of the PVC compound, provide an improved combination of kink resistance and burst strength according to the present invention.

A description of the various layers and layer materials is set forth below, followed by a description of a method of manufacture and specific compounds that illustrate various embodiments of the invention.

In accordance with one embodiment, two separate compounds are prepared, a first composition for forming the inner tube (core layer) and a second composition for forming the outer tube (jacket layer). In one embodiment, the first and second compositions are the same.

The first composition forming the core layer is preferably composed of the following ingredients:
  PVC resin;
  filler material;
  plasticizers; and
  processing aids.

The first composition includes 100 PPH (parts in weight per 100 parts of resin) of the PVC resin, and 45-75 PPH of plasticizer. The PVC resin may include one or multiple PVC resins. In one example the composition includes 70-95 PPH of an ultrahigh molecular weight PVC resin, and 5-30 PPH of a second PVC resin, the latter referred to herein as a "matte PVC resin." In a more particular example, the ratio of UHMW PVC to matte PVC is 80:20, such that for every 80 parts of UHMW resin there is provided 20 parts of matte PVC resin. The matte PVC resin lowers the processing and decreases the melt viscosity temperature (compared to a composition of 100 PPH of the UHMW PVC). The resulting composition is thus easier to process and will better flow in the extruder. The matte PVC resin may be partially cross-linked PVC. It typically has a K value below 80, such as in the range of 73-77 and in one specific embodiment is 75. The matte PVC may be included to provide a matte type of finish, e.g., a less shiny surface as desired for particular use applications.

Filler material may optionally be included in the first composition to both reduce the amount of PVC resin and thus the ultimate cost of the product and/or to improve certain physical properties of the resulting hose, such as hardness and strength. Examples of such filler materials include synthetic or precipitated calcium carbonate ($CaCO_3$), dolomite (calcium magnesium carbonate, $CaMg(CO_3)_2$), talc (magnesium silicate, $Mg_3Si_4O_{10}(OH)_2$) and kaolin (anhydrous aluminum silicate, $Al_2Si_2O_5(OH)_4$). The amount of filler material can vary from 0 to 40 weight percent of the total composition.

A plasticizer is included to provide a more flexible tube structure, as well as to aid in its processing. Suitable plasticizers include phthalate plasticizers, such as phthalate esters, and phthalate-free bio-based plasticizers, such as succinate esters. A suitable phthalate ester is di (2-propyl heptyl) phthalate (DPHP). DPHP provides excellent weathering behavior for outdoor applications. Succinate esters are available that provide properties similar to the phthalate esters. The amount of plasticizer in the formulation is in a range of 45 to 75 PPH, based on 100 parts of the PVC resin.

Other suitable plasticizers include: trimellitates, citric acid ester, adipates, azelates, polyester (e.g., sebacic, azelate, adipic ortho-phthalic acid, terephthalate (e.g., DEHT)) and monoglyceride (hydrogenated castor oil). In one example the plasticizer may comprise a derivative of adipic acid, such as an alkyl ester of adipic acid, such as for example di-2-ethyl-hexal-adipate, commonly known as DOA or DEHA. Other suitable plasticizers are known to those skilled in the art.

The first composition may include processing aids such as lubricants, stabilizers, and antioxidants. Any type of lubricant suitable for PVC mixtures can be used. One example is ethylene bis stearamide, available from BASF (Ludwigshafen, Germany), Huntsman (The Woodlands, Tex., USA), and Dow Chemical (Midland, Mich., USA). Among the usable stabilizers are calcium and zinc based stabilizers, such as calcium stearate and zinc stearate, available from for example Akcrochem (Akron, Ohio, USA), Arkema (Columbus, France), Ferro (Mayfield Heights, Ohio, USA), and Monson (Leominster, Mass., USA). A usable co-stabilizer is for example epoxy soya oil (ESO), although other types of known co-stabilizers suitable for PVC resin can be used. Epoxy soya oil is available from Ferro. Various antioxidants are known for use with PVC, such as Irganox 1010 available from companies such as Ciba (Basel, Switzerland), BASF, and Akcrochem.

A first composition (formulation) for making one or both of the core layer and jacket layer is the following:
100 PPH of PVC resin;
from 45-75 PPH of plasticizer;
from 0.05-1.0 PPH of one or more lubricants;
from 0.1-5.0 PPH of one or more stabilizers;
from 0.2-10.0 PPH of one or more co-stabilizers.

In one embodiment, the first composition may be processed into the core layer by admixing the constituent ingredients in a conventional manner. The admixed forming composition is then introduced into a non-vented, long screw extruder and extruded at a temperature of about 180-190° C. into the inner core tube. A suitable non-vented, long screw extruder is manufactured by Davis-Standard (Pawcatuck, Conn., USA).

The hose construction includes an intermediate reinforcement layer 18, disposed between the inner core layer 14 and outer jacket layer 20. The reinforcing member comprises a pattern of high tensile strength filaments 24 such as polyester, rayon, or nylon fiber that is spirally wrapped, knitted, or braided about the core member, prior to applying the outer jacket by extrusion thereover. In one example, the inner core layer is extruded as a tubular conduit, cooled, and the reinforcing member is then spirally wrapped in a diamond pattern thereabout in a conventional well-known manner (e.g., wrapping machine manufactured by Sidney Tool and Die (Sidney, Ohio, USA)). The fiber reinforced core member can then be continuously applied (e.g., through a first extrusion die by means of a guide barrel) and the second composition (which may be the same as the first composition of the core layer) applied thereover under suitable temperature and pressure (from an extruder to a suitably cylindrically shaped extrusion orifice) to extrude an outer jacket about the reinforced core member. As the hose exits from the extrusion die, the thermoplastic materials are cooled to a semi-rigid (softened) state. They may be further cooled by passing through cold water or other cooling medium to solidify the hose, such that the core layer, reinforcing member, and jacket layer are fused together and form an integral (composite) structure. In one embodiment, a tie material may be used to further enhance the layer bonding. The tie material may be co-extruded with the core layer, before cooling and then applying the reinforcing layer over the tie layer; the tie layer thus helps secure and position the reinforcing member, prior to application of the jacket layer. The tie layer will flow through the interstices of the reinforcing member to bond the core and jacket layers together, with the reinforcing member there between.

Optionally, an outer topcoat 22 may be included as an outermost jacket layer. The topcoat may be coextruded along with the main jacket layer 21. The topcoat may be the same or different from the first or second compositions.

The following examples serve to further illustrate the present invention and are not construed as limiting the scope of the invention.

Examples 1-3

In order to more fully illustrate the preparation of hose according to the invention, three separate forming compositions were prepared as described below.

TABLE 1

| Raw material | $1^{st}$ | $2^{nd}$ | 3rd |
| --- | --- | --- | --- |
| UHMW PCV | 80 | 60 | 100 |
| Matte Resin | 20 | 40 | 0 |
| DPHP | 58 | 75 | 48 |
| EPOXY SOYA OIL | 10 | 10 | 10 |
| Calcium Stearate | 0.15 | 0.15 | 0.15 |
| Zinc Stearate | 0.35 | 0.35 | 0.35 |
| INGANOX 1010 | 0.10 | 0.10 | 0.10 |
| Ethylene Bis-stearamide | 0.15 | 0.15 | 0.15 |
| TiO2 (Titanium dioxide) | 0.5 | 0.0 | 2.0 |

TABLE 2

| Compound Properties | 1st | 2nd | 3rd |
|---|---|---|---|
| Specific Gravity | 1.21 | 1.170 | 1.23 |
| A10 Durometer | 77 | 70 | 80 |
| Tensile Strength | 2821 | 2356 | 2947 |
| Elongation | 277 | 310 | 260 |

Suitable UHMW PVC resin and matte PVC resin may be obtained from the following companies: Mexichem S.A.B. deCV, Tlalnepantla Mexico, www.mexichem.com as a specialty resin under the designation Geon Atlas S 140, having a specific gravity of 1.40 according to ASTM D792 and available under the designation PV-4878 white from AlphaGary Corporation, 170 Pioneer Drive, Leominster, Mass. 01453 (USA), www.alphagary.com, having a specific gravity of 1.21 according to ASTM D792. Other sources of PVC resin include Circes and Oxy Vinyls (Dallas, Tex., USA).

The DPHP and other plasticizers are available from one or more of Eastman Chemical, Exxon (Irving, Tex., USA), and BASF.

The succinate ester and bio-based plasticizers are available from Danisco (Copenhagen, Denmark), Lanxess (Cologne, Germany), Dow Chemical, Myriant (Quincy, Mass., USA), and Evonik (Essen, Germany).

The formulation of the first example above was used to form core and jacket layers of a hose construction having the following configuration;
- an inner core layer of the PVC formulation was coextruded with a tie layer (of PVC clear compound available from Axiall, (Atlanta, Ga., USA)) the core layer having a wall thickness of 0.0535 inch and the tie layer having a wall thickness of 0.004 inch, for a total wall thickness of 0.0575 inch.
- a reinforcement layer of polyester yarn (denier of 500 to 2,000) wrapped around the core in a criss-cross or diamond pattern as shown in FIG. 1;
- an outer jacket layer included two coextruded layers of the same formulation as the core layer, except the outermost jacket layer included a metallic green colorant; the total jacket wall thickness was 0.0505 inch, including a main (inner) jacket wall of 0.0405 inch and an outermost jacket (with colorant) layer of 0.010 inch thickness.

The resulting hose had an inside diameter of 0.625 inch and an outside diameter of 0.841 inch.

The hose was tested for kink resistance as illustrated in FIG. 3. Starting with an 18 inch long section of hose (FIG. 3A), grasp the two ends of the hose A, B, one in either hand, and form a circular loop (FIG. 3B). Continue pulling on each end A, B of the hose in opposite directions, making a smaller and smaller circular loop (FIG. 3C), until eventually a kink develops in the loop (FIG. 3D). Measure the outer diameter across the thickest portion of the loop, presumably mid-way between the kink and the crossed hose end portions A, B. The bend radius is ½ of the measured OD. This test is conducted with an unfilled hose (no flow) at room temperature (25° C.).

Set forth in Table 3 below is a comparison of the kink resistance (bend radius) of one embodiment of the invention compared to two commercially available hoses.

TABLE 3

| Kink Resistance Test | Bend Radius |
|---|---|
| Comparison A | 3.5" |
| Comparison B | 3.25" |
| Invention | 3.0" |

It has been demonstrated that a hose made according to the present invention has a considerably improved kink resistance, while being light weight and strong. The weight of the hose tested was 6.5 lbs. The burst pressure was 520 psi measured according to standard testing methods (ISO 1402:2009).

In various embodiments of the hose, there may be additional layers of the hose, or additional or alternative compositions and additives provided in one or more layers. Examples include other polymer layers or coatings as is known in the art.

While certain representative embodiments and details have been shown for the purpose of illustrating the present invention, it will be apparent to those skilled in this art that various changes and modification can be made therein without departing from the scope of the present invention.

What is claimed is:

1. A garden hose comprising:
    an extruded composite tube including a core layer and a jacket layer of a polyvinyl chloride (PVC) compound;
    an intermediate reinforcement layer disposed between the core layer and the jacket layer, the intermediate reinforcement layer comprising one or more spiraled, braided or fabric filaments wound around the core layer to thereby define a plurality of diamond-shaped interstices; and
    a tie layer disposed between the core layer and the jacket layer, such that the tie layer flows through the plurality of diamond-shaped interstices to fuse the core layer to the jacket layer;
    wherein:
        the PVC compound comprises:
            100 PPH (parts in weight per hundred parts of resin) of PVC resin; and
            45-75 PPH of plasticizer;
        the PVC compound has a K value in a range of 79-85 measured according to standard ISO1628-2 and a specific gravity in a range of 1.17-1.23 measured according to standard ASTM D792;
        the composite tube has a circular cylindrical cross-section and a wall thickness in a range of 115 to 145 mils (thousandths of an inch); and
        a 12 inch length of the composite tube at zero fluid pressure maintains its circular cylindrical cross-section without kinking at a bend radius of less than 3 inches and the composite tube has a minimum burst pressure of 500 psi measured according to standard ISO 1402:2009.

2. The hose of claim 1 wherein the PVC compound includes 60-100 PPH of a first PVC resin having a K value in a range of 81-85, and 0-40 PPH of a second PVC resin having a K value in a range of 73-77.

3. The hose of claim 2 wherein the first PVC resin comprises 70-95 PPH and the second PVC resin comprises 5-30 PPH.

4. The hose of claim 2 wherein the second PVC resin comprises 20-40 PPH and the plasticizer comprises 55-75 PPH.

5. The hose of claim 3 wherein the first PVC resin comprises 80 PPH and the second PVC resin comprises 20 PPH, and the PVC compound has a K value in a range of 79-82.

6. The hose of claim 1 wherein the PVC compound includes one or more additives selected from at least: a heat stabilizer; an anti-oxidant; a lubricant; and a colorant.

7. The hose of claim 1 wherein the PVC compound has a specific gravity in a range of 1.17-1.21.

8. The hose of claim 1 wherein the PVC compound has a K value in a range of 79-82.

9. The hose of claim 1 wherein the PVC compound comprises:
 from 0.5-1.0 PPH of one or more lubricants;
 from 0.1-5.0 PPH of one or more stabilizers; and
 from 0.2-10.0 PPH of one or more co-stabilizers.

10. The hose of claim 1 wherein the plasticizer is selected from the group consisting of phthalate plasticizers and succinate esters.

11. The hose of claim 1 wherein the core layer of the composite tube is co-extruded with the tie layer for bonding the core and jacket layers together.

12. The hose of claim 1 wherein the one or more filaments comprises polymer strands or a textile fabric.

13. The hose of claim 1 wherein the one or more filaments comprises polyester strands wound in a criss-cross pattern around the core layer to thereby define the plurality of diamond-shaped interstices.

14. The hose of claim 1, wherein the composite tube has a bend radius of less than 1 inch.

15. The hose of claim 1, configured for supplying a water pressure of 40-150 psi.

16. The hose of claim 1, wherein the core layer has a circular cross section and wall thickness in a range of 50.5-85.5 mils, and the jacket layer has a circular cross section and wall thickness in a range of 50.5 to 65.5 mils.

\* \* \* \* \*